F. O. FARWELL.
DRIVING MECHANISM FOR MACHINE SPINDLES.
APPLICATION FILED JAN. 23, 1919.
1,393,104.
Patented Oct. 11, 1921.
2 SHEETS—SHEET 1.
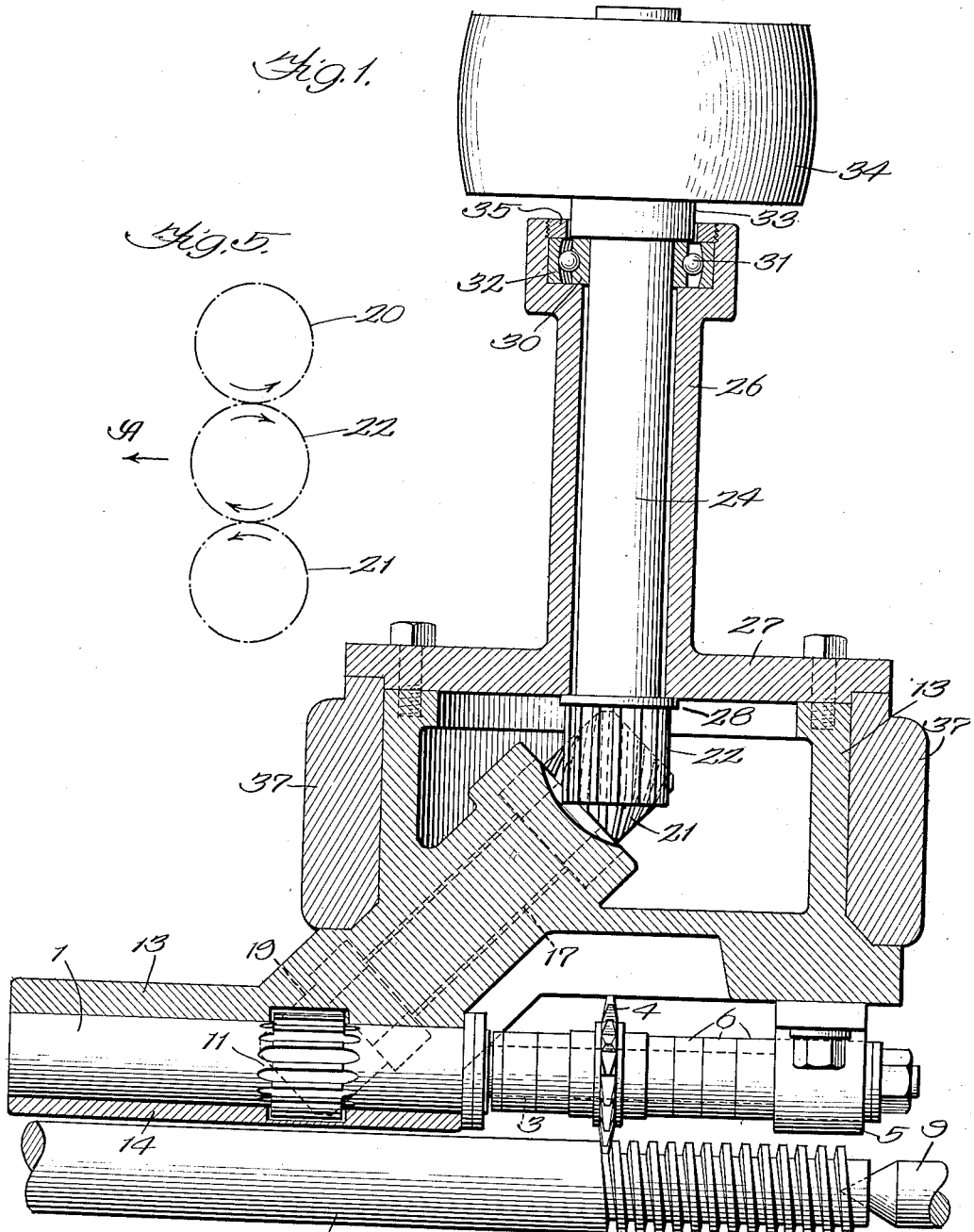
Inventor:
Fay O. Farwell.
By Cheever & Cox
Atty's.

F. O. FARWELL.
DRIVING MECHANISM FOR MACHINE SPINDLES.
APPLICATION FILED JAN. 23, 1919.
1,393,104.
Patented Oct. 11, 1921.
2 SHEETS—SHEET 2.
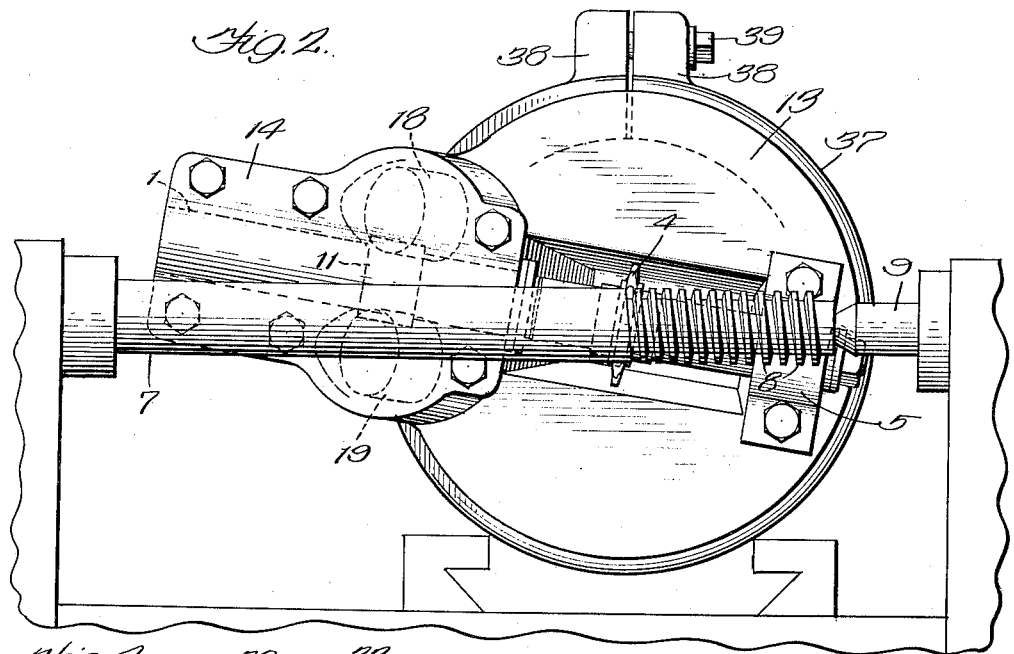
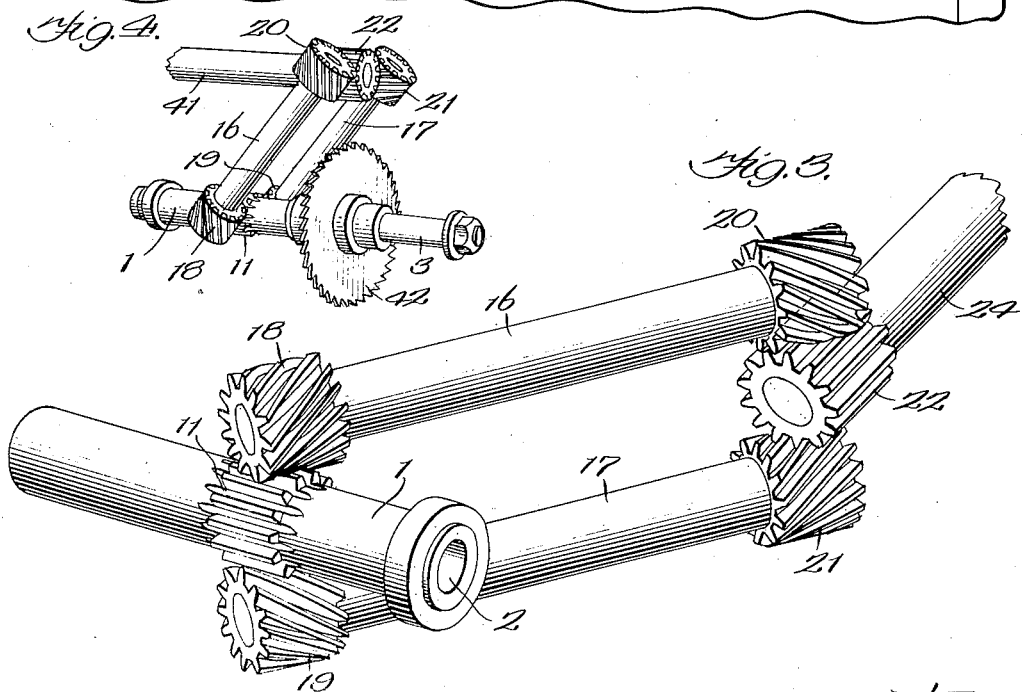
Inventor:
Fay O. Farwell.
By Cheever & Cox
Attys.

UNITED STATES PATENT OFFICE.

FAY O. FARWELL, OF DUBUQUE, IOWA.

DRIVING MECHANISM FOR MACHINE-SPINDLES.

1,393,104. Specification of Letters Patent. Patented Oct. 11, 1921.

Application filed January 23, 1919. Serial No. 272,745.

*To all whom it may concern:*

Be it known that I, FAY O. FARWELL, a citizen of the United States, residing at Dubuque, in the county of Dubuque and State of Iowa, have invented a certain new and useful Improvement in Driving Mechanism for Machine-Spindles, of which the following is a specification.

My invention relates to machine tools, especially spindle or arbor driving mechanism and is particularly applicable to that type of machine in which the cutter spindle for its entire length is brought into close proximity to the work. One example of such a machine is a thread milling machine. A milling cutter is preferably of small diameter and consequently the spindle and spindle driving mechanism must be compact so as to clear the work. It is evident that if any of the driving mechanism on the work side, should project as far as the cutting edge of the tool, the mechanism would collide with the work. Another example is a rack milling machine in which the spindle and spindle driving gears must pass over the rack blank close enough to permit a cutter of standard diameter to enter the rack blank. Another example is a circular sawing machine for cutting in two bars of considerable length. Unlike a wood cutting circular saw, which may be driven at high speed by a belt over a pulley of small diameter, a metal cutting saw or cutter requires much power and yet runs at a slow speed, so that the spindle driving mechanism must impart a large torque to the spindle if the machine is to perform its work rapidly and efficiently.

In the machines of the type referred to, it is common practice to drive the spindle by means of a spur gear meshing with and driving a spur gear on the spindle, which is necessarily very small for the reason above given. Such a spindle drive is very deficient in torque because the spindle gear is small, is driven from one side only, and because of the excessive spindle bearing friction created by the above mentioned conditions.

One object of my invention is to provide a spindle driving mechanism that will impart a greatly increased torque to the spindle. Another object is to reduce the spindle bearing friction and side-thrust by providing means for applying power to both sides of the spindle gear. Another object is to provide means for balancing or equalizing the torque thus supplied to the two sides of the spindle gear. Another object is to impart a smooth and more constant turning moment to the spindle. Another object is to provide means whereby the helical angle of the thread produced upon the work may be varied. Other contributory objects will become apparent from the following description.

I accomplish my objects by the mechanism illustrated in the accompanying drawings in which—

Figure 1 is a plan section of the assembled mechanism.

Fig. 2 is a front elevation thereof.

Fig. 3 is a perspective view showing more in detail the relationship and construction of the driving and driven members and the intermediate members which transmit power from one to the other.

Fig. 4 is a perspective view similar to Fig. 3, but showing a modified arrangement in which the drive shaft is arranged parallel to the spindle instead of at right angles as shown in Fig. 3.

Fig. 5 is a diagram illustrating the principle by which the balanced torque is obtained.

Like numerals denote like parts throughout the several views.

In the form selected to illustrate the invention disregarding for the moment Fig. 4, the spindle 1 has a taper hole 2 adapted to receive the end of an arbor 3 which carries the tool 4. The arbor is provided with a bearing 5 at the end opposite to spindle 1 and is held longitudinally by spacing collars 6. In the present case the work consists of a round bar 7 upon which helical threads 8 are to be produced. The work is held at one end by a tail stock center 9 and at the opposite end is supported and rotated by any convenient mechanism, such as a rotating head stock. The parts as thus far described are of any suitable known form and need no further description.

In the form shown the tool 4 is a thread milling cutter, but it will be understood that a metal saw, rack milling cutter, or other tool may be substituted for other classes of work. A spindle driving gear 11 is preferably formed integral with the spindle with its teeth parallel to the axis thereof. This gear by preference is but slightly larger in diameter than the spindle itself so that the work may approach closely to the spindle. The bearing for the spindle is formed preferably of a housing 13 provided with a box cap 14 bolted or otherwise secured in position. The construction is such as to prevent lateral movement of the spindle—that is, movement transverse to the spindle axis. The housing 13 also constitutes a bearing for the two intermediate shafts 16, 17. These shafts are arranged preferably at an oblique angle to the spindle and have spiral gears 18 and 19 respectively which mesh with the spindle gear 11. At the opposite ends of these intermediate shafts are spiral gears 20 and 21 respectively which mesh with the driving gear 22.

In the preferred form the intermediate shafts lie at an angle of approximately 45° with the spindle and the other bearings are so constructed that the intermediate shafts are parallel with each other and held against lateral and endwise movement in their bearings. In the illustrated form the driving gear 22 is a spur gear and fastened to or integral with driving shaft 24. The shaft is inclosed in a sleeve 26 which in the present case is formed integral with a plate 27 bolted to and forming a cover for the housing 13. The inner end of the shaft has a collar 28 which bears against the inner side of plate 27. This end of the shaft fits loosely within the sleeve, the result being that the gear 22 is capable of a certain amount of movement transverse to its axis. Consequently, the gear may be said to "float" between the two gears 20, 21.

The outer end of the shaft is provided with a ball race 30 and balls 31 which run in a segmental bearing 32. The shaft has a collar 33 for preventing endwise movement and is driven by a pulley 34 or other appropriate power device. In the particular design shown, the bearing 32 is held in place by a threaded ring 35. The purpose of the segmental bearing is to afford means for holding the outer end of the shaft substantially stationary and at the same time permitting a certain amount of lateral movement at the inner end of the shaft.

The body of the housing 13 is journaled in a bearing 37 which holds the housing in such position that the axis of rotation of the housing will be coincident with a line passing approximately from the acting point of the tool to the axis of the spindle. When the machine is in operation the housing will be rigidly held in its bearing by appropriate means. In the form illustrated this is accomplished by splitting the bearing and providing it with two threaded ears 38, 38 which may be tightened by means of a screw 39.

In operation, when the driving shaft 24 is rotated by its pulley 34 or otherwise, the gear 22 automatically positions itself between its two coöperating gears 20, 21 in such manner as to exert an equal turning moment or torque upon each of them. If gearing could be cut with absolute accuracy, commercially, and the bearings perfectly positioned and the wear of the various parts equalized, it would be unnecessary to provide a bearing which would permit the gear 22 to float. But if said gear were rigidly mounted in its bearing and inaccurately formed, even to a comparatively slight extent, it would exert a greater torque upon one of the two enmeshed gears than the other. The result would be that the gears 18, 19 would exert a greater torque upon one side of the gear 11 than upon the other side. This would produce lateral thrust of the spindle in its bearings, thus creating unnecessary friction and unequal wear. But by employing my construction in which the gear 22 floats in its bearing, any inaccuracy in the gear cutting or mounting is automatically compensated for.

The principle is illustrated diagrammatically in Fig. 5. Let it be assumed that the driving gear 22 is rotating in a clockwise direction, and that its teeth bear firmly against the upper gear 20 but do not so firmly engage the teeth of the lower gear 21. The teeth of gear 20 will act as a "purchase," so to speak, and the driving gear, finding less pressure against the teeth at the bottom and being free to move laterally will swing toward the left as indicated by the arrow at A. The middle gear will swing until the torque exerted upon the lower gear 21 will be equal to the torque on the upper gear 20. After the torques are thus balanced the tendency of the middle gear to move toward the left will be neutralized by its tendency to move toward the right, and hence there will be no lateral thrust of said gear relatively to its bearings.

This balancing or equalizing effect will likewise compensate for any inaccuracy in the gear cutting or positioning of the spindle gear, and of the gears 18, 19 which mesh with it. Consequently, the turning moments or torques on the two opposite sides of the spindle gear will be equalized and the lateral thrust of the spindle in its bearing will be eliminated. Thus equal power will be applied to the two sides of the spindle gear and it will be possible to deliver twice as much power to it as could be applied through the medium of a single driving gear. Furthermore, the lateral thrust, which would be great if the spindle gear were driven from but one side only, is totally eliminated.

If it is desired to change the helical angle of the thread which is being produced, all that is necessary is to rotate the housing 13 in its bearing 37. As said housing constitutes the bearing both for the spindle and the two intermediate shafts 16, 17 they move as a unit about an axis coincident through a line drawn from the acting point of the tool to the axis of the work.

In the form shown in Figs. 1 to 3 the axis of the driving shaft is at right angles to the axis of the spindle. In the form shown in Fig. 4 the principle is the same, but the driving shaft 41 is arranged parallel to the spindle. The gear 22, however, remains the same as before, being driven by shaft 41 and floating between the two enmeshed gears 20 and 21. In this view a metal cutting saw 42 is shown fastened to the arbor instead of the milling cutter as in Figs. 1 and 2.

From the foregoing it will be seen that as a result of my invention it is possible by the use of comparatively simple mechanism to apply power to both sides of the spindle gear and not only automatically balance the two torques exerted upon it, but at the same time practically eliminate the side thrust of the spindle in its bearing. This makes it possible also to locate the spindle very close to the work without danger of having the spindle gear or the spindle bearings interfere with the work even though the latter may be of great length. It also becomes a simple matter to vary the helical angle notwithstanding the fact that the spindle gear is driven by gears located on both sides of it.

Having thus described my invention what I claim as new and desire to secure by Letters Patent, is:—

1. In combination, a driven gear wheel, a driving gear wheel, two intermediate shafts each having a gear wheel at each end, the wheels at one end of the shafts engaging the opposite sides of the driven wheel and the wheels at the opposite ends of said shafts engaging the opposite sides of the driving gear wheel, the driving gear wheel being adapted to shift freely in a direction at right angles to its axis to impart equal torque to the two wheels with which it engages, for thereby delivering equal turning forces to the two opposite sides of the driven gear wheel.

2. In combination, a driven gear wheel, a driving gear wheel, two intermediate shafts each having a gear wheel at each end, the wheels at one end of the shafts engaging the opposite sides of the driven wheel and the wheels at the opposite ends of said shafts engaging the opposite sides of the driving gear wheel, the driving gear wheel mounted upon a driving shaft the end whereof nearest said driving gear wheel being adapted to float within reasonable limits to thereby equalize the power delivered to the wheels it engages.

3. A machine tool having a spindle for rotating the tool, a spindle gear for rotating said spindle, two intermediate shafts arranged at an oblique angle to the spindle, said shafts having gears engaging the opposite sides of the spindle gear, intermediate gear wheels one on each of said intermediate shafts for driving them, a driving shaft, and a driving gear on said driving shaft, the opposite sides of said driving gear engaging said intermediate gears, said driving shaft being arranged at an oblique angle to said intermediate shafts.

4. A structure as specified in claim 3 in which the intermediate shafts are parallel to each other.

5. In combination, a driving member interposed centrally and capable of floating between two intermediate members, and a driven member interposed centrally between said two intermediate members whereby the driven member is acted upon from opposite sides to give it a double turning power and a balanced torque.

6. A tool spindle adapted to rotate in bearings and be held against lateral movement, a gear on said spindle for rotating it, intermediate gears engaging the spindle gear at opposite sides, intermediate shafts for driving the intermediate gears, said shafts rotating in bearings and being held against lateral movement, said intermediate shafts each having a second intermediate gear by which it is driven, a driving shaft having a gear interposed between the second intermediate gears, and a bearing for said driving shaft adapted to permit said driving shaft to move laterally sufficiently to engage the second intermediate gears with equal turning moment whereby the cutter spindle is rotated from both sides with equal turning power.

7. A tool spindle adapted to rotate in bearings and be held against lateral movement, a gear on said spindle for rotating it, intermediate gears engaging the spindle gear at opposite sides, intermediate shafts for driving the intermediate gears, said shafts rotating in bearings and being held against lateral movement, said intermediate shafts each having a second intermediate gear by which it is driven, a driving shaft having at one end a gear interposed between the second pair of intermediate gears, and at the other end a power device, and a bearing for said driving shaft adapted to permit lateral movement of the end which carries the driving gear and to substantially prevent lateral movement of the opposite end of said driving shaft.

8. A structure as specified in claim 7, in which the last mentioned bearing is a segmental ball bearing.

9. In combination, a driving member with a gear thereon, a driven member with a gear thereon, intermediate driving members set at an oblique angle to both driving and driven members and engaging both on opposite sides of their respective gears, the driven member and the intermediate members rotating in bearings which prevent lateral movement, the driving member being adapted to float laterally sufficiently to compensate for any inaccuracy in the gearing whereby the driven member receives from the driving members an equal turning moment from opposite sides.

10. A structure as specified in claim 9 in which the axis of rotation of the driving member if produced would intersect the produced axis of the driven member at right angles to it.

11. In combination, a driven member, a driving member the axis whereof is at right angle to the axis of the driven member, a pair of intermediate members adapted to transmit equal amounts of power from the driving member to the opposite sides of the driven member, bearings for said intermediate members and a bearing for the first mentioned bearings adapted to permit them to rotate bodily about the produced axis of the driving member.

12. A machine tool adapted to produce helical threads upon the work, said machine having a work holder, a tool spindle, a gear for driving said spindle, a spindle bearing, a main bearing in which the spindle bearing is journaled and adapted to permit the spindle bearing to rotate about an axis passing through the axis of the work and the point of contact between the tool and the work, driving members engaging the opposite sides of the spindle gear, a power device simultaneously engaging said driving members and adapted to automatically deliver equal amounts of power to them, and bearings for said driving members movable in unison with the spindle bearing, whereby it is possible to vary the helical angle of the thread which the machine forms upon the work.

13. A machine tool adopted to produce a helical thread upon the work, said machine having a work holder, a tool spindle, a spindle gear for driving the tool spindle, intermediate shafts having gears engaging the opposite sides of the spindle gear, a driving gear, a second gear on each said intermediate shafts adapted to engage opposite sides of the driving gear, bearings for said spindle and shafts, and a main bearing wherein the first mentioned bearings are journaled so as to rotate bodily about an axis at right angles to the axis of the work to thereby vary the helical angle of the thread produced upon the work.

14. A structure as specified in claim 13 in which the spindle is prevented from moving laterally in its bearings but one of the other gears mentioned is afforded a limited lateral movement for equalizing the torque applied to the two opposite sides of the spindle gear.

15. A machine tool adapted to produce a helical thread upon the work, said machine having a work holder, a tool spindle, a spindle gear on said spindle, a driving gear, two intermediate shafts having gears at both ends, the gears at one end engaging opposite sides of the spindle gear and the gears at the opposite ends engaging the opposite sides of the driving gear, a unitary structure forming a bearing for all of said gears and for the spindle, said structure being adapted to prevent lateral movement of the spindle but permit lateral movement of one of the other gears mentioned for equalizing the torque applied to the two different sides of the spindle gear, and a bearing for said unitary structure adapted to permit the latter to vary the angle of the tool relatively to the axis of the shaft to thereby vary the helical angle of the thread produced upon the work.

In witness whereof, I have hereunto subscribed my name.

FAY O. FARWELL.